Dec. 24, 1963
G. SANDNES
3,115,216
ROPE AND CABLE STOPPER FOR DERRICKS
Filed May 14, 1962
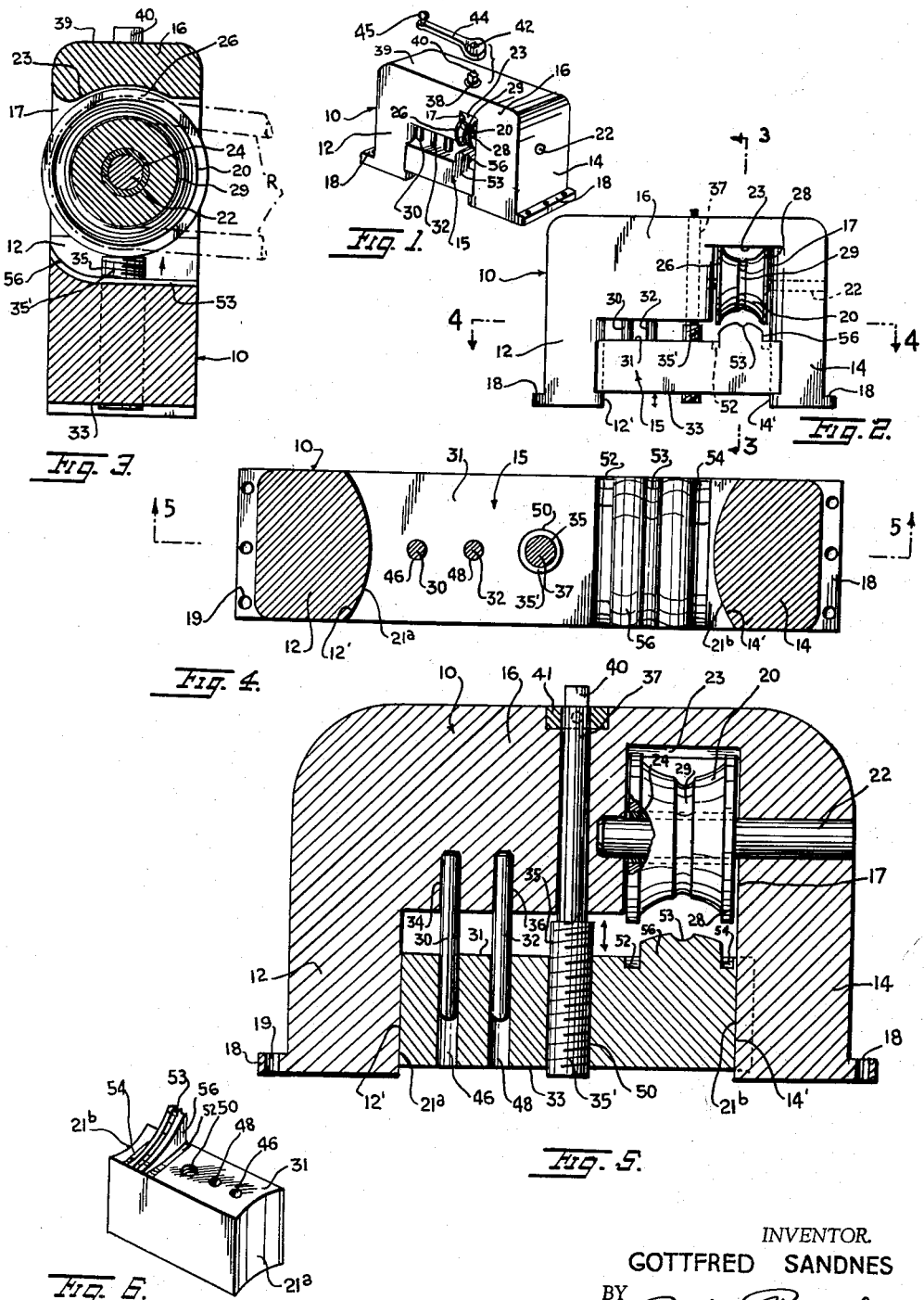
INVENTOR.
GOTTFRED SANDNES
BY
*Zoltan Holochek*
ATTORNEY

United States Patent Office 3,115,216
Patented Dec. 24, 1963

3,115,216
ROPE AND CABLE STOPPER FOR DERRICKS
Gottfred Sandnes, 216 78th St., Brooklyn, N.Y.
Filed May 14, 1962, Ser. No. 194,527
1 Claim. (Cl. 188—65.2)

This invention concerns a device for stopping slippage of a rope or cable in a derrick, winch, or other hoisting machine.

According to the invention, there is provided a device of the character described especially useful on shipboard, docks and other marine locations. The device includes a generally U-shaped bracket in the bight of which is a rotatable pulley for entraining a rope or cable. Between the legs of the bracket is a movable clamping block provided with a groove to engage the rope or cable. The bracket carries a rotatable screw engaged in a threaded bore in the block, and two parallel guide rods. The opposite ends of the block are curved to slidably engage corresponding curved sides of the legs of the bracket.

It is a principal object of the invention to provide a device which is mountable on a suitable surface for entraining a rope or cable, the device being provided with screw means for quick engagement and quick releasing of the rope or cable.

A further object is to provide a device as described, including a U-shaped bracket and movable block with parts of the block engaged slidably with parts of the bracket, and with a pulley carried in the bight of the bracket.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a perspective view of a device embodying the invention, shown with an associated operating crank.

FIG. 2 is a side elevational view of the device on a larger scale.

FIGS. 3 and 4 are sectional views taken on lines 3—3 and 4—4, respectively, of FIG. 2.

FIG. 5 is a sectional view taken on line 5—5 of FIG. 4.

FIG. 6 is a perspective view of the clamping block, on a reduced scale.

Referring to the drawings, there is shown a generally U-shaped bracket 10 having two parallel legs 12, 14 and a horizontal bight 16 joining the legs. Flanges 18 are provided at bottom edges of the legs. These flanges have holes 19 for receiving bolts to mount the bracket on a suitable supporting surface. In the bight 16 is a slot 17. A pulley 20 is rotatably mounted on a shaft 22 extending transversely across the slot. The pulley has a bushing 24 which serves a bearing to permit free rotation of the pulley on the shaft. The upper side 23 of the slot is curved, as clearly shown in FIG. 3. The outer annular flanges 26, 28 of the pulley fit into the recess defined by the curved upper side of the slot. The pulley has a centrally located peripheral groove 29 in which a rope or cable R can be engaged. Two cylindrical guide rods 30, 32 are secured in bores 34, 36 formed in the bight 16. The rods extend downwardly between the legs 12, 14 of the bracket. A threaded screw 35 also extends downwardly from the bight. The upper cylindrical end 37 of the screw is rotatably disposed in a bore 38 formed in the bight and held therein by a retaining ring 41. The upper rectangular end 40 of the screw extends out of the top surface 39 of the bracket. This end 40 can be engaged in the rectangular hole 42 of a crank 44 shown in FIG. 1. The crank has a handle 45 for manual turning of the crank.

A generally rectangular block 15 fits slidably between legs 12, 14. The inner opposing sides 12', 14' of the legs are convex and engage concave end farces $21^a$, $21^b$ of the block. The block has two smooth bores 46, 48 which slidably receive the rods 30, 32. The bores extend through the block from flat upper side 31 to flat bottom side 33. A threaded bore 50 is aligned with and receives the threaded end 35' of screw 35. Two spaced curved grooves 52, 54 are formed in the upper surface of the block to receive the lower portions of flanges 26, 27 of the pulley. Between grooves 52, 54 is a ridge 56 elevated above upper side 31 of the block. The ridge is curved in cross section as shown in FIG. 3, and has a central curved groove 53 which receives the underside of rope or cable R as indicated in FIG. 3.

In operation of the device, the rope or cable R will be entrained around the pulley 20. The rope will pass freely around the pulley as the pulley turns. When it is desired to stop the rope or cable, the screw will be engaged by crank 44 and the screw will be turned to draw the block 15 upwardly until the rope is engaged in groove 53 of ridge 56. The pulley will be prevented from turning and the rope will be prevented from slippage when the screw is fully tightened. The guide rods 30, 32 insure that the block moves vertically in the plane of the bracket when the screw is turned. The interengaged curved end faces of the block and opposing inner sides of the legs also serve as guide members when the block is being drawn up or moved down in the space between the legs and in addition prevent the block from being twisted out of the bracket when the screw 35 is fully tightened and the rope is under tension. The rope is released by loosening screw 35 to lower block 15.

The device permits one man handling the crank 44 to operate the device. The device can handle a considerable range of sizes of ropes and cables and can be made in any size required. The several parts are preferably made of massive metal such as iron, bronze or the like.

The device fulfills a long felt need in the marine field for a device which will enable control of ropes used in derricks, cranes, winches and the like. The device will facilitate the loading and unloading of cargo between ship and dock. It is simple in construction, rugged and long lasting. It is easy to mount and use wherever required.

While I have illustrated and described the preferred embodiment of my invention, it is to be understood that I do not limit myself to the precise construction herein disclosed and that various changes and modifications may be made within the scope of the invention as defined in the appended claim.

Having thus described my invention, what I claim as new, and desire to secure by United States Letters Patent is:

A rope or cable slippage preventer for a winch, derrick or the like, comprising a generally U-shaped bracket, means connected to the bracket for securing said bracket to a supporting surface, said bracket having parallel legs and a bight joining the legs, said bight having a slot therein, a pulley mounted in the said slot and freely rotatable therein, said pulley being disposed parallel to said legs, a block movably disposed between the legs of the bracket, guide means limiting the block to movements in the plane of the bracket, means for preventing the block from sliding downwardly out of the bracket, a screw having one unthreaded end rotatably disposed in said bight, said unthreaded end having a rectangular upper extremity for receiving a turning tool, said screw having; a threaded end engaged turnably with said block for advancing and retracting the block toward and away from the bight, upon turning said rectangular extremity, and a ridge formed on said block, said ridge having a curved surface parallel to and facing said pulley for engaging a rope or cable between said curved surface and said pulley when the screw is tightened, upon the turning of said rectangular extremity, said legs having inner opposing curved sides, said block having curved end faces engaged with said curved sides of the legs to prevent the block from being twisted out of the bracket when the screw is tightened and the rope is under tension, said guide means including a pair of parallel guide rods secured in bores in said bight and extending outwardly of the bight between the legs, said block having smooth other bores slidably receiving said rods.

References Cited in the file of this patent
UNITED STATES PATENTS

| | | |
|---|---|---|
| 287,856 | Parsels | Nov. 6, 1883 |
| 366,736 | Pritchett | July 19, 1887 |
| 475,115 | Inglesby | May 17, 1892 |
| 601,029 | Weber | Mar. 22, 1898 |
| 666,879 | White | Jan. 29, 1901 |
| 2,333,646 | Frankel | Nov. 9, 1943 |
| 2,462,969 | Holliday | Mar. 1, 1949 |
| 2,960,739 | Warr | Nov. 22, 1960 |